Figure 1:
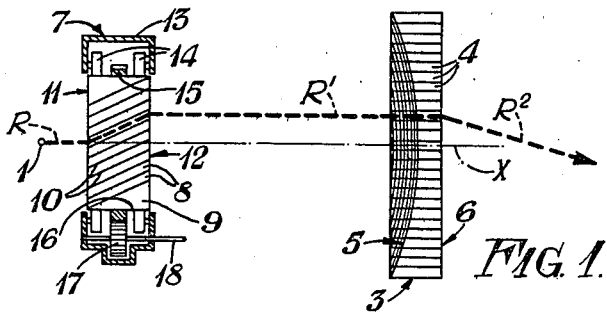

April 27, 1954    C. A. COCHRANE ET AL    2,677,056
AERIAL SYSTEM
Filed July 24, 1951    2 Sheets-Sheet 1

INVENTORS
Charles Alexander Cochrane and Eric Arthur North Whitehead
BY Cameron, Kerkam & Sutton
ATTORNEYS April 27, 1954   C. A. COCHRANE ET AL   2,677,056
AERIAL SYSTEM
Filed July 24, 1951   2 Sheets-Sheet 2
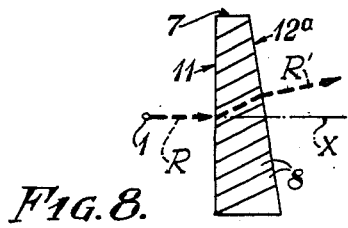
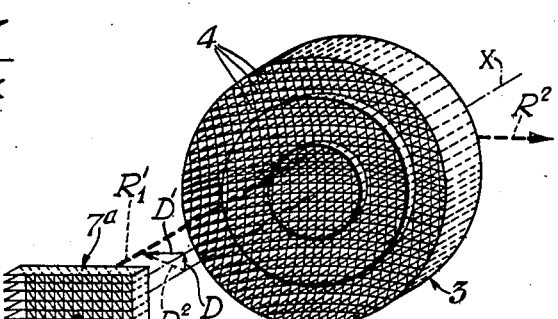
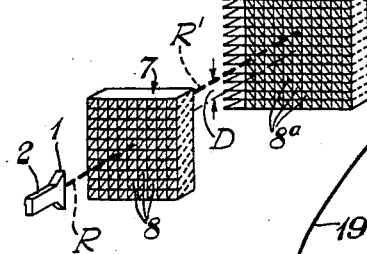
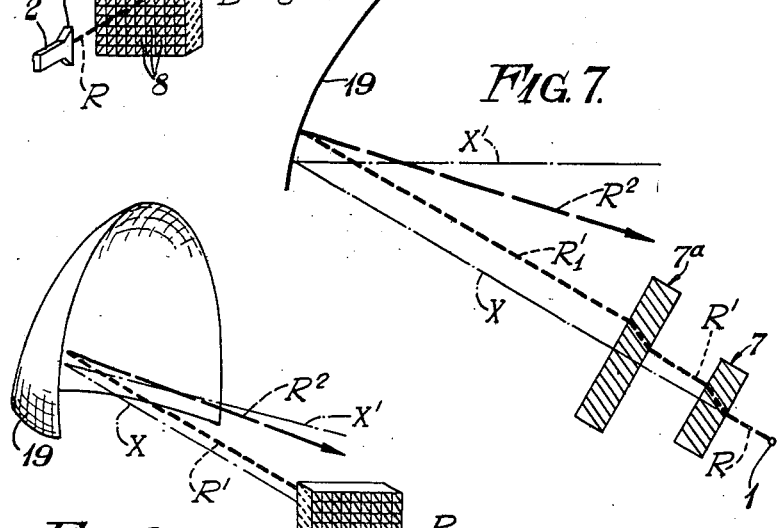
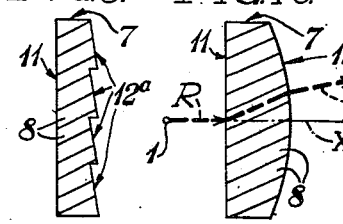
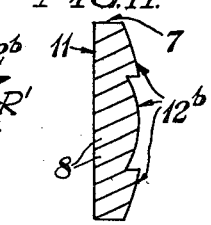
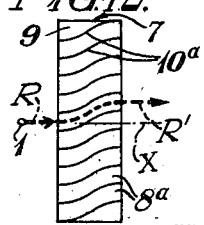
INVENTORS
Charles Alexander Cochrane and Eric Arthur North Whitehead
BY Cameron, Kerkam & Sutton
ATTORNEYS Patented Apr. 27, 1954

2,677,056

UNITED STATES PATENT OFFICE 2,677,056

AERIAL SYSTEM

Charles Alexander Cochrane, Potters Bar, and Eric Arthur North Whitehead, St. Albans, England, assignors to Elliott Brothers (London) Limited, London, England, a company of Great Britain Application July 24, 1951, Serial No. 238,292

Claims priority, application Great Britain July 28, 1950

16 Claims. (Cl. 250—33.63)

This invention relates to aerial systems for radiating radio frequency energy of very short wave length, e g. of the order of a few centimetres, in the form of a narrow beam, such systems being employed in radar and in radio navigation aids, for example, landing equipment for airfields.

It is known in such aerial systems to produce small periodical deflections of the radiated beam for scanning purposes but the means heretofore employed for achieving this have suffered from certain disadvantages, such as the necessity for the provision of rotating joints in a concentric transmission line, or in a wave guide, which feeds the energy to the primary radiator, the difficulty of suitably mounting and rotating a reflector element of the aerial system, or deterioration of the radiation polar diagram as the deflection of the direction of the main lobe thereof is increased beyond a certain small angle.

The object of the present invention is to provide improved aerial systems of the character referred to embodying simple means for scanning the radiated beam which shall not be subject to the disadvantages mentioned and shall afford certain added advantages.

According to the invention, an aerial system comprises a primary radiator, a secondary radiating element disposed so that it is illuminated by the radiation from the primary radiator and constructed to emit radiation having an approximately plane wave-front when so illuminated, at least one scanning element located in the path of the radiation from the primary radiator to the secondary element and adapted to produce a displacement of the radiation transversely to its direction of propagation without substantially altering the latter, and means for rotating the scanning element about an axis parallel with the said direction of propagation.

The primary radiator is preferably a horn supplied with microwave energy from a transmitter by way of a waveguide and the secondary radiating element may be either a lens or a mirror.

More than one scanning element may be provided and the respective elements may then be rotated at the same or different speeds and in the same or in opposite directions. Moreover, the several elements may be set at various angular positions in relation to each other prior to being rotated all in the same direction and at the same speed.

The scanning elements are preferably composed of a plurality of similar tubes of square cross-section nested closely together in honey- comb or "egg-box" fashion, the one or inlet ends of all the tubes being located in a single plane and the other or outlet ends of all the tubes preferably being located in another plane parallel to the first. In some cases, however, these outlet ends of the tubes may be located in a plane which forms a dihedral angle with the first plane or is curved to form part of a spherical or similar surface. In all cases, however, the tubes are so disposed or shaped between their ends that a line joining the centre points of the cross-sections at the two ends of any tube will be other than normal to the plane containing the inlet ends of the tubes. Additionally, the length of a side of the square cross-section of a tube is generally of the order of the wave-length of the radiation to be dealt with but not less than half this wave-length.

Figure 3:
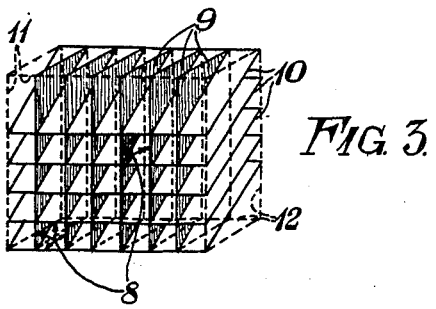
Figure 2:
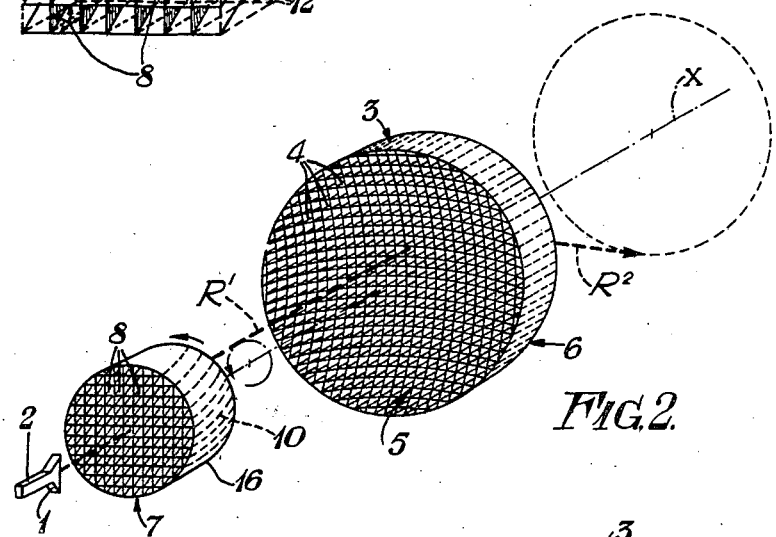
Figure 4:
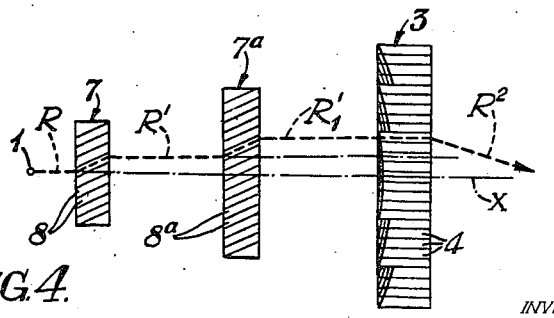

Some examples of the way in which the invention may be carried into effect will now be described with reference to the accompanying somewhat diagrammatic drawings, wherein:

Fig. 1 is a sectional elevation illustrating one form of the aerial system according to the invention in which a single scanning element is employed in conjunction with a known type of lens aerial, Fig. 2 is a perspective view of the arrangement of Fig. 1, some parts being omitted, Fig. 3 is a perspective view to a larger scale illustrating one method of construction of a scanning element, Fig. 4 is a view similar to that of Fig. 1, but illustrating a form of the aerial system according to the invention in which two scanning elements are employed in series, the lens aerial shown being modified in relation to that of Fig. 1 in a known manner, Fig. 5 is a perspective view of the arrangement of Fig. 4, Fig. 6 is a perspective view illustrating another form of the aerial system according to the invention in which a single scanning element is employed in conjunction with a mirror aerial, Fig. 7 is a diagrammatic sectional elevation of an aerial system employing two scanning elements in series in combination with a mirror aerial, Fig. 8 is a side elevation of a scanning element such as is shown in Fig. 3 combined with a prism, Fig. 9 is a similar view of a combined scanning element and prism, the latter being of stepped construction.

Fig. 10 is a sectional elevation of a scanning element such as is shown in Fig. 3 combined with a lens, Fig. 11 is a similar view of a combined scanning element and lens, the latter being of stepped construction, and Fig. 12 is a side elevation of a scanning element constructed in a different manner from that of Fig. 3.

In these figures corresponding parts are indicated by like reference numerals and characters.

In the first example, which is illustrated in Figs. 1 and 2, the primary radiator is a horn 1 (shown in Fig. 1 as a small circle) supplied with micro-wave energy from a transmitter (not shown) by means of a wave guide 2 (Fig. 2). As is known, such a radiating element acts substantially as if it were a point source of radiation, the radiation emitted having a substantially spherical wave-front. This horn 1 is located on the axis X of a lens aerial 3 constituted of a large number of wave guides 4 of square cross-section nested together in honeycomb or "egg-box" fashion (see Fig. 2), the wave guides being relatively short and having their axes disposed parallel to the axis X of the system. The inlet ends of the wave guides are located on a spherical or other suitably shaped surface 5 which is concave towards the horn 1 and which may, if desired, be stepped in the known manner (indicated for the lens 3 in Figs. 4 and 5), whereas the outlet ends of the wave guides 4 are disposed in a plane 6 normal to the axis X of the system. The dimensions and curvatures are so chosen, in the well-known manner, that the radiation illuminating the lens 3 will emerge from the latter with a substantially plane wave-front.

Between the horn 1 and the lens 3 is disposed a scanning element 7 in the form of a large number of square section wave guides 8 nested together in honeycomb fashion. Such an element (see Fig. 3) may be produced from two series of parallel plates, 9 and 10, arranged with the plates 9 in one series at right-angles to those 10, in the other series in the so-called "egg-box" fashion. The inlet ends of the wave guide tubes 8 thus constituted are disposed in a plane 11 normal to the axis X of the system and the outlet ends of the wave guide tubes are located in another plane 12 parallel to and spaced from the first plane. In addition, the axes of the tubes 8 are inclined with respect to the axis X of the system so that the centre point of the inlet end of any tube will be located at a different distance from the axis of the system than is the centre point of the outlet end of the same tube.

The scanning element 7 is arranged symmetrically with respect to the axis X of the system and is mounted to rotate about that axis. Any suitable means may be employed for mounting and rotating the element 7 but, purely as an example, there is shown in Fig. 1 an outer cage 13 in which the arrangement of plates 9 and 10 is mounted for rotation on rollers 14, an annular toothed gear 15 secured on a cylindrical enclosing wall 16 for the plates being adapted to be driven by a pinion 17 which is connected to a motor (not shown) by a shaft 18. This, or an equivalent, arrangement may be employed for mounting and rotating the other scanning elements referred to below and will not be illustrated in connection with these.

It can be shown that radiation having a spherical wave-front (having its axis indicated by the broken line R) incident upon the face 11 of the scanning element 7 will emerge from the other face 12 of this element as radiation (see broken line $R^1$) also having a spherical wave-front but which is displaced transversely to its direction of propagation without its direction of propagation having been changed to any substantial extent. It will be seen therefore that rotation of the scanning element 7 will cause the axis of radiation $R^1$ to generate a cylindrical surface with the consequent emission from the lens 3 of a conically scanning beam, the axis $R^2$ of the beam generating a conical surface and the cone angle of the scanning beam being determined by the amount of displacement undergone by the radiation during its passage through the scanning element 7.

In order that scanning patterns of very varied form may be produced, it is preferred, as shown in Figs. 4 and 5, to provide a second scanning element, marked 7a, of the same character as that just described and to locate it parallel with the first scanning element 7 so that the entry ends of its wave guide tubes 8a will be illuminated by the radiation $R^1$ transmitted through the first element. The second scanning element 7a is also mounted for rotation about the axis X of the system. When the wave-guide tubes 8 and 8a of the respective elements 7 and 7a are similarly disposed, as is shown in Fig. 4, the radiation (indicated by its axis $R'_1$) emitted from the outlet face of the element 7a will be displaced still more away from the axis X of the system than is the radiation R' incident upon the inlet face of the element 7a, although the direction of propagation of the radiation will not have been changed to any substantial extent. When the tubes 8a are set at an angle to the tubes 8 (see Fig. 5), the displacement D produced by the element 7 has the displacement $D^1$ produced by the element 7a vectorially added thereto to produce a total displacement $D^2$ of the axis of the radiation $R'_1$ with respect to the axis X of the system. It will be appreciated that the respective displacements D and D' produced by the elements 7 and 7a are always vectorially added together to produce the total displacement $D^2$. Although the invention is not limited to such an arrangement, it is convenient for some purposes to arrange that the displacements D and D' are of equal magnitudes.

Assuming that the displacements D and D' are of equal magnitude, rotation of the scanning elements 7 and 7a in opposite directions at the same speed will produce a line scan of the beam $R^2$. Again, rotation of the elements 7 and 7a in the same sense and at the same speed, makes it possible to produce a conical scan of any desired cone angle up to twice the maximum available for a single element. Different cone angles are secured by altering the angular disposition of the scanning elements 7 and 7a in relation to each other. Other scanning patterns of the epicycloid and hypocycloid types may be produced by rotating the scanning elements at different speeds.

Further examples of an aerial system according to this invention are illustrated in Figs. 6 and 7. The primary radiator is again a horn 1 but the secondary radiating element is a reflector 19. The horn is arranged to illuminate the reflector while being located out of the path of the normal radiation from the latter (indicated by the axis X'). In these cases, one or more scanning elements constructed in the manner described above are disposed between the horn and the reflector but again outside the path of the radiation from the reflector. In Fig. 6 there is shown a single scanning element 7 while in Fig. 7 there are two elements 7 and 7a. When these scanning elements are rotated the beam $R^2$ from the reflector 19 is scanned as above set forth, the scanning produced with the arrangement of Fig. 6 corresponding to that produced with the arrangement of Figs. 1 and 2. Fig. 7 corresponds to Figs. 4 and 5.

In some cases the, or one of the, scanning elements may also be so shaped that it will perform the additional function of a subsidiary lens or prism in the aerial system. For example, see Fig. 8, the plane 12a containing the outlet ends of the wave guide tubes 8 of the scanning element 7 may be inclined so that it will form a dihedral angle with the plane 11 containing the inlet ends of the tubes. Alternatively, see Fig. 10, the plane 12b containing the outlet ends may be curved to form part of a spherical or other suitably shaped surface. In either case, it will be understood that the inclined or curved surface 12a or 12b thus obtained may be stepped in the known manner, as shown in Figs. 9 and 11, respectively, so that the weight of the scanning element may be kept to a minimum.

The scanning elements may be produced in other ways than that shown in Fig. 3, for example, by employing plates 10a which are bent to an S-shape, as shown in Fig. 12, in conjunction with the plates 9. The radiation R from the primary radiator will be displaced transversely of the direction of propagation (axis X), as it passes through the S-shaped wave guide tubes 8a, to emerge as the radiation R¹.

What we claim is:

1. A high frequency aerial system comprising a secondary radiating element adapted when illuminated with radiation to emit radiation having an approximately plane wave-front, a primary radiator arranged to illuminate the secondary radiating element with radiation following a predetermined path in space, at least one scanning element located in said path and comprising means for displacing radiation incident thereon transversely to its direction of propagation without substantially altering the latter, said radiation-displacing means including a plurality of wave-guides of substantially square cross-section nested together in parallel relation with their axes inclined to said direction of propagation, and means for rotating the scanning element about an axis parallel with said direction of propagation.

2. An aerial system as claimed in claim 1, in which the primary radiator is a horn.

3. An aerial system as claimed in claim 1, in which the secondary radiating element is a lens aerial.

4. An aerial system as claimed in claim 1, in which the secondary radiating element is a mirror.

5. In a high frequency aerial system embodying a secondary radiating element adapted to emit radiation having an approximately plane wave-front when radiation having an approximately spherical wave-front is incident thereon, a rotatable scanning element in the path of the incident radiation for displacing the radiation transversely to its direction of propagation in a direction dependent upon the angular setting of the scanning element in relation to said direction of propagation, said scanning element comprising a plurality of wave-guides of substantially square cross-section nested together in parallel relation with their axes inclined to said direction of propagation, and means for rotating the scanning element about an axis parallel with said direction of propagation.

6. A high frequency aerial system comprising a secondary radiating element adapted when illuminated with radiation to emit radiation having an approximately plane wave-front, a primary radiator arranged to illuminate the secondary radiating element with radiation normally following a predetermined path in space, a first scanning element located in said path and comprising means which when illuminated with radiation will emit radiation of the same character along a second path parallel with but displaced transversely with respect to the first-mentioned path, means for rotating the first scanning element to cause said second path to describe a surface of revolution about the first-mentioned path, a second scanning element located between the first scanning element and the secondary radiating element to intercept the radiation following said second path and comprising means which when illuminated with radiation will emit radiation of the same character along a third path parallel with but displaced transversely with respect to said second path, and means for rotating the second scanning element to cause said third path to describe a surface of revolution about the first-mentioned path, each of said scanning elements including a plurality of wave-guides of substantially square cross-section nested together in parallel relation with their axes inclined to said first-mentioned path.

7. An aerial system as claimed in claim 6, in which the rotations of the respective scanning elements are effected at different speeds.

8. An aerial system as claimed in claim 6, in which the rotations of the respective scanning elements are effected in opposite directions.

9. An aerial system as claimed in claim 6, in which the first and second scanning elements are set in a predetermined angular position relative to each other and their rotations are effected in the same direction and at the same speed.

10. A scanning element for an aerial system of the character described, comprising a plurality of similar tubes of square cross-section nested closely together with their axes parallel to one another and with those ends of the tubes upon which radiation is to be incident located in a common plane normal to the direction of propagation of the radiation, a line joining the centre points of the cross-sections at the two ends of any tube being other than normal to said common plane.

11. A scanning element as claimed in claim 10, in which all the tubes are of equal length.

12. A scanning element as claimed in claim 10, in which those ends of the tubes from which radiation is to be emitted are located in a plane which forms a dihedral angle with said common plane.

13. A scanning element as claimed in claim 10, in which those ends of the tubes from which radiation is to be emitted are located in a curved plane.

14. A high frequency aerial system comprising a wave-guide horn adapted to emit radiation along a predetermined path, a lens aerial disposed in said path, at least one scanning element located in said path between the horn and the lens and adapted to produce a displacement of the radiation from the horn into a new path substantially parallel with said predetermined path and occupying an angular position about the latter determined by the angular setting of the scanning element about the same predetermined path, said scanning element including a plurality of wave-guides of substantially square cross-section nested together in parallel relation with their axes inclined to said predetermined path, and means for rotating the scanning element about an axis substantially coincident with said predetermined path.

15. A high frequency aerial system comprising a wave-guide horn adapted to emit radiation along a predetermined path, a reflector aerial disposed in said path, at least one scanning element located in said path between the horn and the reflector and adapted to produce a displacement of the radiation from the horn into a new path substantially parallel with said predetermined path and occupying an angular position about the latter determined by the angular setting of the scanning element about the same predetermined path, said scanning element including a plurality of wave-guides of substantially square cross-section nested together in parallel relation with their axes inclined to said predetermined path, and means for rotating the scanning element about an axis substantially coincident with said predetermined path.

16. A scanning element for a high frequency aerial system comprising means adapted to produce a lateral displacement between radiation incident thereon and radiation emitted therefrom without substantially changing the direction of propagation of the radiation, said displacement-producing means including a plurality of wave-guide tubes of substantially square cross-section nested together in parallel relation with the aves of the tubes so arranged as to be other than parallel with the direction of propagation of the incident radiation, and means for rotating said displacement-producing means about an axis substantially parallel with said direction of propagation.

References Cited in the file of this patent

UNITED STATES PATENTS

| Number | Name | Date |
|---|---|---|
| 2,422,579 | McClellan | June 17, 1947 |
| 2,442,951 | Iams | June 8, 1948 |
| 2,505,569 | Nowak | Apr. 25, 1950 |
| 2,571,129 | Hansen | Oct. 16, 1951 |